No. 739,340. PATENTED SEPT. 22, 1903.
J. B. ORBISON.
MELTING FURNACE.
APPLICATION FILED FEB. 12, 1903.
NO MODEL. 2 SHEETS—SHEET 1.
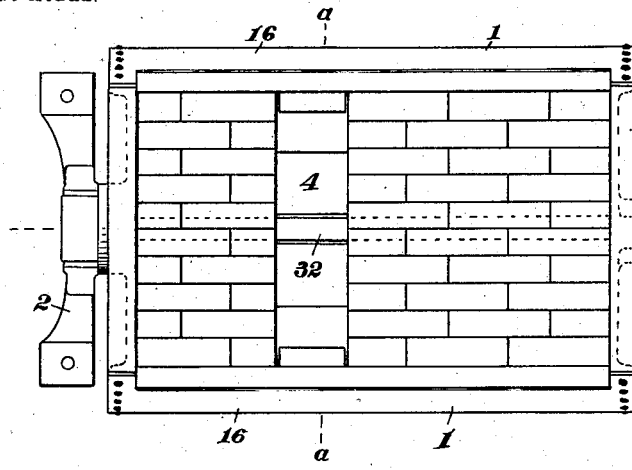
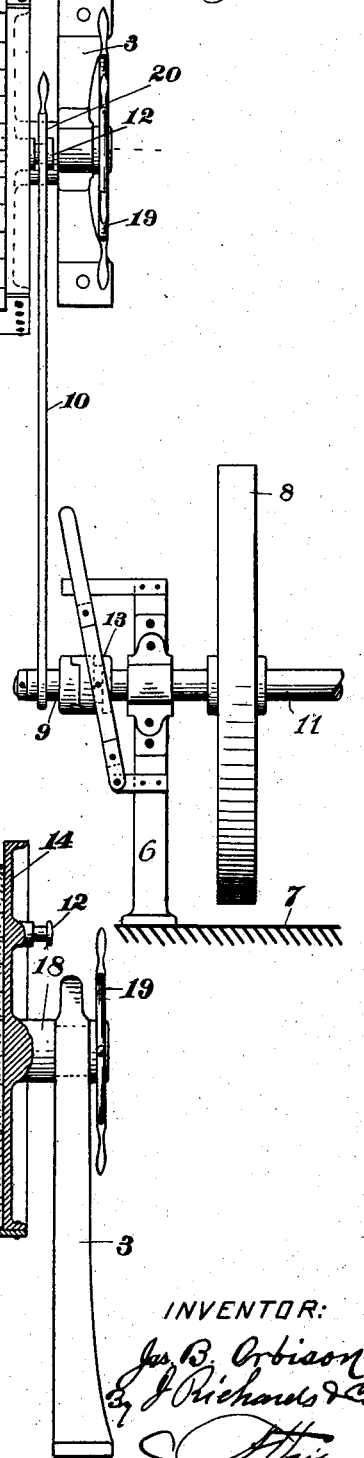
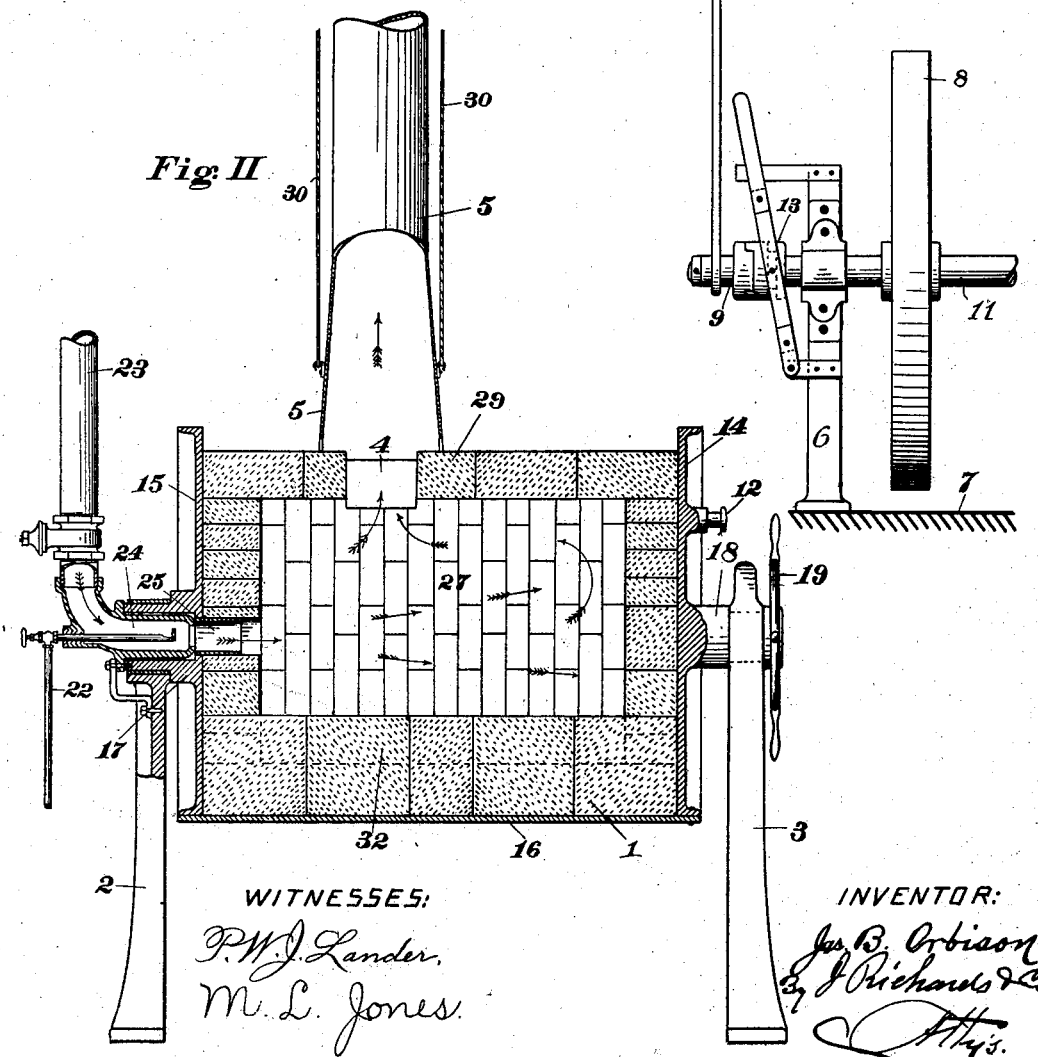
WITNESSES:
P. W. J. Lander.
M. L. Jones.
INVENTOR:
Jas. B. Orbison.
By J. Richards & Co.
Attys.

No. 739,340. PATENTED SEPT. 22, 1903.
J. B. ORBISON.
MELTING FURNACE.
APPLICATION FILED FEB. 12, 1903.
NO MODEL. 2 SHEETS—SHEET 2.
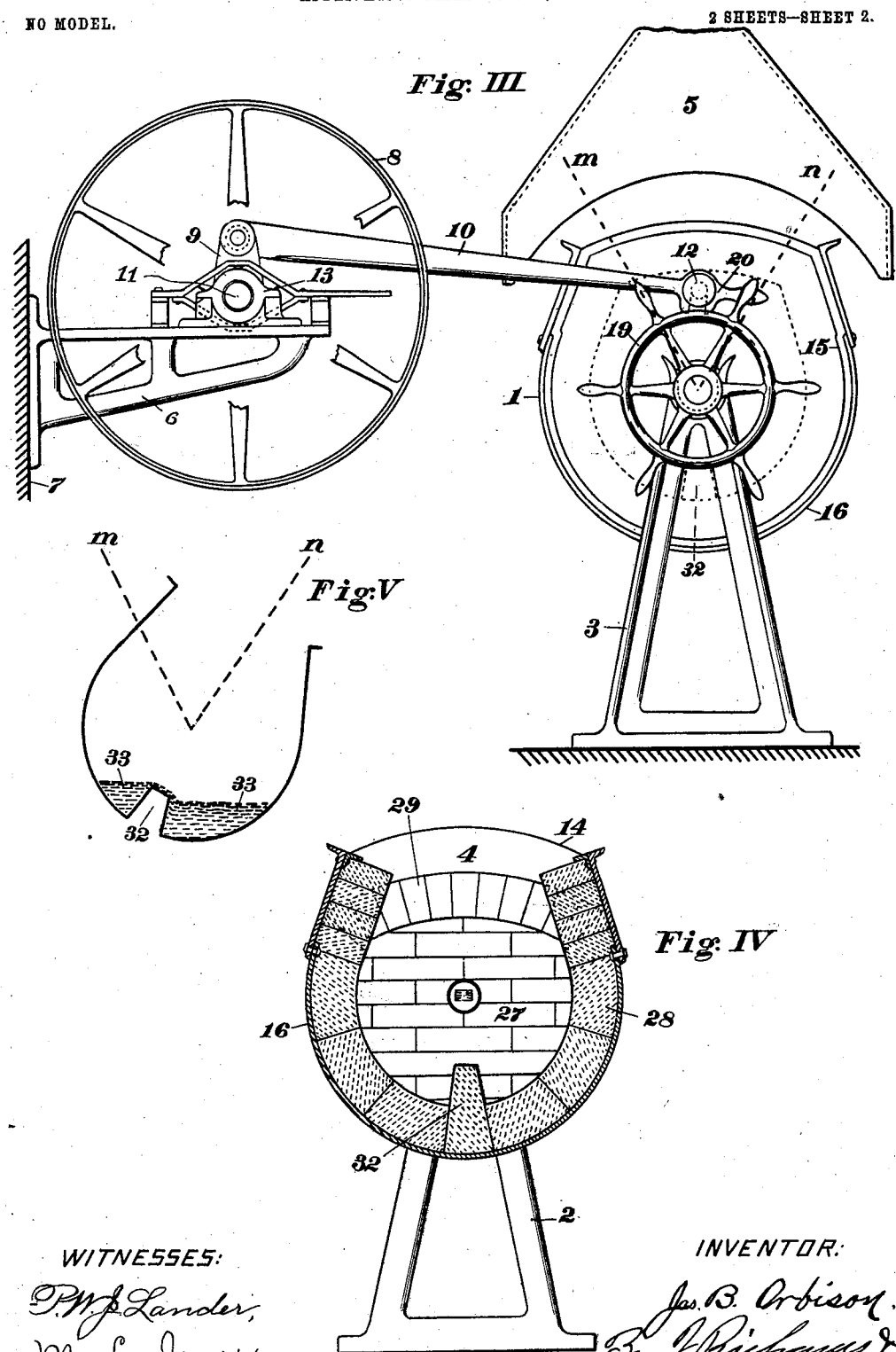
WITNESSES:
P. W. S. Lander,
M. L. Jones.
INVENTOR:
Jas. B. Orbison.

No. 739,340. Patented September 22, 1903.

UNITED STATES PATENT OFFICE.

JAMES B. ORBISON, OF SAN FRANCISCO, CALIFORNIA, ASSIGNOR TO HENRY D. MORTON, OF SAN FRANCISCO, CALIFORNIA.

MELTING-FURNACE.

SPECIFICATION forming part of Letters Patent No. 739,340, dated September 22, 1903.

Application filed February 12, 1903. Serial No. 142,993. (No model.)

*To all whom it may concern:*

Be it known that I, JAMES B. ORBISON, a citizen of the United States, residing at San Francisco, county of San Francisco, and State of California, have invented certain new and useful Improvements in Melting-Furnaces; and I hereby declare the following to be a full, clear, and exact description of the same, reference being had to the accompanying drawings, forming a part of this specification.

The invention relates to furnaces for melting metal, especially brass and like alloys, adapted for liquid or gaseous fuel and to certain improvements in such furnaces, as hereinafter described, and illustrated by drawings that form a part of this specification.

My improvements consist in an oscillating furnace of circular or horseshoe form mounted on trunnions, devices to give a reciprocating movement to the furnace throughout a range of arc sufficient to agitate the contents, and in a dam or barrier longitudinally disposed within the furnace, over which the melted metal flows or is poured each way, causing a homogeneous mixture of alloys and otherwise improving the heating action of the furnace and the quality of the melted metals produced therein.

The objects of the invention are an economy of the heat applied by reason of a more effective exposure of the metal to its action, complete homogenity of the melted metals or alloys thereof, celerity of the process of melting, and convenience of operating.

To these ends I construct and employ devices substantially as illustrated in the drawings, Figure I being a plan view of one of my improved melting-furnaces, including the gearing for giving motion to the same. Fig. II is a side view, mainly in section, to show the interior construction; Fig. III, an end view of the same furnace and its operating mechanism. Fig. IV is a transverse section on the line *a a* in Fig. I, and Fig. V a diagram to illustrate the action of the baffling-dam in the interior of the furnace.

In melting metals to form alloys, especially when their specific gravity is not the same, and to secure an effective application of heat agitation is necessary not only of the mass as a whole, but by disintegration or mixing after a fluid state is reached. Such agitation is here attained by an oscillating movement of a furnace of semicircular form and the reciprocal flow of the melted metal, which is baffled and broken up at each motion, as illustrated in the drawings, wherein—

1 is the main furnace; 2 and 3, supporting-standards for the same; 4, a charging-way, and 5 an adjustable hood and flue to carry off the fumes and gases from the furnace.

The mechanism to operate the furnace is preferably mounted by brackets 6 on a wall 7 to save floor-room, and consists of a rotary shaft 11, driving-pulley 8, crank 9, and connecting-rod 10, that extends to a crank-pin 12 on the end of the furnace 1, a common clutch 13 being provided to stop and start the crank 9 and oscillating motion of the furnace 1. The said connecting rod or pitman 10 has an open or slotted hook 20 as a means of attachment and detachment of the pitman to and from the crank-pin 12. The furnace can, if desired, be oscillated by hand by means of the hand-wheel 19.

The furnace 1 is constructed with strong end plates 14 and 15, combined and held by a metallic covering-plate 16 and having at their center trunnions 17 and 18, through one of which heat is introduced, as shown in Fig. II. The other trunnion 18 extends through the supporting-stand 3 to receive the hand-wheel 19, employed to turn and handle the furnace 1 when the cam-hook 20 is detached. Heat is introduced through the trunnion 17, usually generated by liquid or gaseous fuel supplied through a pipe 22. Air enters through the pipe 23, and the flame in the combustion-chamber 24 is driven through the nozzle 25 into the melting-chamber 27.

The furnace 1 is lined with refractory material, preferably fire-brick 28, as shown in Fig. IV, and is arched over the top, as at 29, leaving a chargeway 4, that is beneath a vertically-adjustable hood and flue 5, held in equilibrium by cords or chains 30 and the usual counterweights employed in such cases. At the bottom and in the center, longitudinally of the furnace 1, I provide a baffling-dam 32, also composed of refractory material and projecting above the bottom of the furnace to a distance approximately as shown in Figs. IV and V. This dam 32 forms an important part of my invention, operating as indicated in the diagram Fig. V. The metal 33 pours each way over the dam 32 as the furnace oscillates from side to side, as indicated by the dotted lines m and n. Fig. V indicates the right-hand position of the furnace. As the melted metal flows over the dam 32 it is not only mixed and stirred, but is by this means more uniformly exposed to the heat entering at 25.

In operating, the furnace is charged through the aperture 4 in the usual manner. The gaseous fuel supplied by the pipe 22 is ignited in the chamber 24, and when the metal 33 is melted or at any time before this the cam-hook 20 is connected the clutch 13 is engaged, so the furnace 1 is set in motion, oscillating from side to side until the melted metal has attained the required fluidity and is thoroughly mixed. Then the cam-hook 20 is detached and the furnace 1 is decanted, and the metal is poured off by means of the hand-wheel 19, as will be understood.

Having thus explained the nature and purposes of my invention and the manner of its use, what I claim as new, and desire to obtain by Letters Patent, is—

1. A melting-furnace mounted on trunnions, means to oscillate said furnace, and a longitudinally-disposed barrier or dam at the bottom of the furnace, to cause a mixing of the alloys as the furnace is oscillated.

2. A melting-furnace mounted on trunnions, having a longitudinally-disposed barrier at the bottom of said furnace, in combination with rotatory gear and a crank for operating the furnace, a crank-pin connected with the furnace, and a pitman provided with a hook for detachably connecting said rotatory crank with said crank-pin, whereby the furnace is mechanically oscillated.

3. A melting-furnace mounted on trunnions, one of which is hollow, means to oscillate the furnace, a longitudinal barrier or dam at the bottom of the furnace, and means for introducing a jet of flame through said hollow trunnion into the furnace, for melting the contents thereof.

4. In a revoluble melting-furnace, detachable gearing to produce an oscillatory motion of the same, a charging-way at the top of the furnace, and at the opposite side or bottom a longitudinally-disposed barrier or dam over which the melted metal is poured from right to left and the reverse, substantially as and for the purposes specified.

5. In a revoluble melting-furnace detachable mechanism to produce an oscillating motion of the same, a hollow trunnion on which the furnace is supported at one end, a gaseous fuel-burner communicating with this hollow trunnion and with the interior of the furnace, and a longitudinally-disposed dam in the latter over which the metal flows as the furnace oscillates from side to side, combined and operating substantially as described.

In testimony whereof I have signed my name to this specification in the presence of two subscribing witnesses.

JAMES B. ORBISON.

Witnesses:
GEO. H. DUNNING,
A. L. TAYLOR.